US012706342B2

(12) United States Patent
He et al.

(10) Patent No.: US 12,706,342 B2
(45) **Date of Patent: *Aug. 11, 2026**

(54) CELL, POWER BATTERY PACK, AND ELECTRIC VEHICLE

(71) Applicant: BYD COMPANY LIMITED, Shenzhen (CN)

(72) Inventors: Long He, Shenzhen (CN); Huajun Sun, Shenzhen (CN); Wenfeng Jiang, Shenzhen (CN); Zhipei Lu, Shenzhen (CN); Weixin Zheng, Shenzhen (CN); Jianglong Tang, Shenzhen (CN); Yan Zhu, Shenzhen (CN); Xinyue Wang, Shenzhen (CN); Kefeng He, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,546

(22) Filed: Mar. 14, 2024

(65) Prior Publication Data

US 2024/0222760 A1 Jul. 4, 2024

Related U.S. Application Data

(63) Continuation of application No. 17/422,084, filed as application No. PCT/CN2019/092349 on Jun. 21, 2019, now Pat. No. 12,113,227.

(30) Foreign Application Priority Data

Jan. 9, 2019 (CN) ......................... 201910020925.5
Jan. 9, 2019 (CN) ......................... 201910020967.9
(Continued)

(51) Int. Cl.
*H01M 50/209* (2021.01)
*B60K 1/04* (2019.01)
(Continued)

(52) U.S. Cl.
CPC ............ *H01M 50/209* (2021.01); *B60K 1/04* (2013.01); *B60L 50/64* (2019.02); *B60L 50/66* (2019.02);
(Continued)

(58) Field of Classification Search
CPC ............ H01M 50/209; H01M 10/052; H01M 10/425; H01M 10/613; H01M 10/625;
(Continued)

(56) References Cited

U.S. PATENT DOCUMENTS 9,083,062 B2 7/2015 Kumar et al.
2004/0038126 A1* 2/2004 Gu ..................... H01M 50/191 429/185
(Continued)

FOREIGN PATENT DOCUMENTS

CN 101257100 A 9/2008
CN 102893426 A 1/2013
(Continued)

OTHER PUBLICATIONS

International Search Report of application No. PCT/CN2019/092349 dated Sep. 30, 2019.

*Primary Examiner* — Michael L Dignan
(74) *Attorney, Agent, or Firm* — Calfee, Halter & Griswold LLP

(57) ABSTRACT

A cell, a power battery pack, and an electric vehicle are provided. The cell includes a cell body, and the cell body has a length L, a width H and a thickness D. The length L of the cell body is greater than the width H, the width H of the cell body is greater than the thickness D, the length L of the cell
(Continued)

body is greater than 600 mm, and the length L and the width H of the cell body satisfy L/H=4-21.

20 Claims, 11 Drawing Sheets

(30) Foreign Application Priority Data

Jan. 9, 2019 (CN) ........................ 201910021244.0
Jan. 9, 2019 (CN) ........................ 201910021246.X
Jan. 9, 2019 (CN) ........................ 201910021247.4
Jan. 9, 2019 (CN) ........................ 201910021248.9

(51) Int. Cl.

| | |
|---|---|
| ***B60L 50/60*** | (2019.01) |
| ***B60L 50/64*** | (2019.01) |
| ***H01M 10/052*** | (2010.01) |
| ***H01M 10/42*** | (2006.01) |
| ***H01M 10/613*** | (2014.01) |
| ***H01M 10/625*** | (2014.01) |
| ***H01M 10/647*** | (2014.01) |
| ***H01M 10/6551*** | (2014.01) |
| ***H01M 10/6554*** | (2014.01) |
| ***H01M 50/103*** | (2021.01) |
| ***H01M 50/119*** | (2021.01) |
| ***H01M 50/244*** | (2021.01) |
| ***H01M 50/249*** | (2021.01) |
| ***H01M 50/271*** | (2021.01) |
| ***H01M 50/317*** | (2021.01) |
| ***H01M 50/342*** | (2021.01) |
| ***H01M 50/35*** | (2021.01) |
| ***H01M 50/383*** | (2021.01) |
| ***H01M 50/531*** | (2021.01) |
| ***H01M 50/543*** | (2021.01) |
| *B60L 58/26* | (2019.01) |

(52) U.S. Cl.

CPC ....... *H01M 10/052* (2013.01); *H01M 10/425* (2013.01); *H01M 10/613* (2015.04); *H01M 10/625* (2015.04); *H01M 10/647* (2015.04); *H01M 10/6551* (2015.04); *H01M 10/6554* (2015.04); *H01M 50/103* (2021.01); *H01M 50/119* (2021.01); *H01M 50/244* (2021.01); *H01M 50/249* (2021.01); *H01M 50/271* (2021.01); *H01M 50/317* (2021.01); *H01M 50/342* (2021.01); *H01M 50/3425* (2021.01); *H01M 50/35* (2021.01); *H01M 50/383* (2021.01); *H01M 50/531* (2021.01); *H01M 50/543* (2021.01); *B60K 2001/0405* (2013.01); *B60K 2001/0438* (2013.01); *B60L 58/26* (2019.02); *H01M 2010/4271* (2013.01); *H01M 2220/20* (2013.01)

(58) Field of Classification Search

CPC ........... H01M 10/647; H01M 10/6551; H01M 10/6554; H01M 50/103; H01M 50/119; H01M 50/244; H01M 50/249; H01M 50/271; H01M 50/317; H01M 50/342; H01M 50/3425; H01M 50/35; H01M 50/383; H01M 50/531; H01M 50/543; H01M 2010/4271; H01M 2220/20; H01M 10/6569; H01M 10/6556; H01M 1/6567; H01M 10/6568; H01M 50/131; H01M 50/367; H01M 50/223; B60K 1/04; B60K 2001/0405; B60K 2001/0438; B60L 58/26; B60L 50/66; B60L 50/64

See application file for complete search history.

(56) References Cited

U.S. PATENT DOCUMENTS

| | | | | |
|---|---|---|---|---|
| 2012/0028105 A1* | 2/2012 | Kumar | H01M 10/482 429/152 |
| 2013/0115506 A1* | 5/2013 | Wayne | H01M 10/613 429/120 |
| 2013/0196192 A1 | 8/2013 | Harada et al. | |
| 2015/0037626 A1* | 2/2015 | Malcolm | H01M 10/613 429/90 |
| 2017/0084899 A1* | 3/2017 | Deng | H01M 50/569 |
| 2019/0259990 A1* | 8/2019 | Ligabue | H01M 10/625 |

FOREIGN PATENT DOCUMENTS

| | | | | |
|---|---|---|---|---|
| CN | 103227311 A | 7/2013 | |
| CN | 104576999 A | 4/2015 | |
| CN | 106450089 A | 2/2017 | |
| CN | 107394279 A | 11/2017 | |
| CN | 108717961 A | 10/2018 | |
| DE | 102009046801 A1 | 5/2011 | |
| EP | 1391950 * | 4/2002 | H01M 4/58 |
| EP | 2502291 B1 | 7/2020 | |
| JP | H06-203813 A | 7/1994 | |
| JP | 2001185093 A | 7/2001 | |
| JP | 2004063436 A | 2/2004 | |
| JP | 2012174532 A | 9/2012 | |
| JP | 2013157156 A | 8/2013 | |
| JP | 2013225420 A | 10/2013 | |
| JP | 2014-008532 A | 1/2014 | |
| JP | 2017-197093 A | 11/2017 | |
| JP | 2018524759 A | 8/2018 | |
| JP | 6595108 B2 | 10/2019 | |
| KR | 20160076156 A | 6/2016 | |
| KR | 20180081000 A | 7/2018 | |
| KR | 20180112017 A | 10/2018 | |
| KR | 20190000211 A | 1/2019 | |
| WO | 2011060980 A1 | 5/2011 | |
| WO | 2014065110 A1 | 5/2014 | |
| WO | 2017221536 A1 | 12/2017 | |

* cited by examiner

CELL, POWER BATTERY PACK, AND ELECTRIC VEHICLE

CROSS-REFERENCE TO RELATED APPLICATIONS

This application is a continuation application of U.S. patent application Ser. No. 17/422,084, filed on Jul. 9, 2021, which has now issued as U.S. Pat. No. 12,113,227, which is the National Stage of PCT Application No. PCT/CN2019/092349, filed on Jun. 21, 2019, which claims priority to Chinese Patent Application Serial Nos. "201910021244.0", "201910020967.9", "201910021246.X", "201910021248.9", "201910021247.4", and "201910020925.5", filed by BYD Company Limited on Jan. 9, 2019. The entire contents of the above-referenced applications are incorporated herein by reference.

FIELD

This application relates to the technical field of batteries, and in particular, to a cell, a power battery pack having the cell and an electric vehicle having the power battery pack.

BACKGROUND

In the related art, for example, a power battery pack applied to an electric vehicle, mainly includes a pack body and a plurality of battery modules mounted in the pack body. Each battery module is assembled by a plurality of cells. Users' requirements on the battery life of electric vehicles are becoming higher. However, in the case of limited space at the bottom of the vehicle body, power battery packs in the prior art have the problem of low space utilization and the energy density of such power battery packs cannot meet the requirements, which gradually becomes an important factor hindering the development of electric vehicles.

SUMMARY

In the related prior art, due to the limitations from internal resistance and overcurrent of cells, the size of the cells will not be too large. When the cells are assembled into a battery module and then the battery module is placed on a battery tray, two opposite ends of the cells cannot be fitted to two opposite side beams arranged in a battery pack due to the small size and short length of the cells. Therefore, a transverse beam 500' and/or a longitudinal beam 600' (as shown in FIG. 1) is/are needed to be provided in an accommodating device, to facilitate the cell assembly.

As shown in FIG. 1, a housing 200" of a power battery pack 10' is often divided into a plurality of mounting regions for battery modules 400' by the transverse beam 500' and the longitudinal beam 600'. The battery modules 400' are fixed on the transverse beam 500' or the longitudinal beam 600' by screws or other means. The battery module 400' includes a plurality of cells arranged in sequence. The plurality of cells are arranged to form a cell array. End plates and/or side plates are disposed outside the cell array. Usually, both the end plates and side plates are disposed. The end plates and the side plates are fixed to define a space for accommodating the cell array. In addition, the end plates and the side plates are connected by screws, or by other connecting members such as a pull rod, so as to fix the cell array.

The applicant finds through experiments and analysis that because the battery modules 400' are fixed on the transverse beam 500' or the longitudinal beam 600' by screws, space is wasted, and the use of screws or other connecting members increases the weight. In addition, because the battery modules 400' are designed with the end plates and side plates which all have a certain thickness and height, space inside the housing 200" is wasted, leading to low utilization of the volume of the housing 200". Generally, for the power battery pack 10' in the prior art, the ratio of the sum of the volumes of cells in the housing 200" to the volume of the housing 200" is about 50%, or even lower than 40%.

For the power battery pack 10' provided in embodiments in the prior art, the end plates and the side plates of the battery module 400' and the connection and mounting manners inside the power battery pack 10' reduce the utilization of the space inside the housing 200". As a result, in the power battery pack 10', the ratio of the sum of the volumes of cells to the volume of the housing 200" is too low, and the energy density cannot meet the increasing requirements of users on the battery life of electric vehicles.

This application is intended to resolve at least one of the technical problems existing in the prior art. In view of this, an object of the present application is to provide a cell, which has a high heat dissipation ability and facilitates the overall arrangement in a power battery pack to improve the space utilization and increase the energy density of the power battery pack, thereby enhancing the battery life of the power battery pack The present application also provides a power battery pack having the cell.

The present invention also provides an electric vehicle having the power battery pack.

According to an embodiment in a first aspect of the present application, a cell is provided, which includes a cell body, and the cell body has a length L, a width H and a thickness D. The length L of the cell body is greater than the width H, the width H of the cell body is greater than the thickness D, the length L of the cell body is greater than 600 mm, and the length L and the width H of the cell body satisfy L/H=4-21.

The cell according to the embodiment of the present application has a high heat dissipation ability and facilitates the overall arrangement in the power battery pack to improve the space utilization and increase the energy density of the power battery pack, thereby enhancing the battery life of the power battery pack.

According to an embodiment in a second aspect of the present application, a power battery pack is provided, which includes a housing; a plurality of cells according to the embodiment in the first aspect of the present application, which are arranged in the housing.

The power battery pack according to the embodiment of the present application has the advantages of high space utilization, large energy density and long battery life, by using the cells according to the embodiment in the first aspect of the present application.

According to an embodiment in a third aspect of the present application, an electric vehicle is provided, which includes the power battery pack according to the embodiment in the second aspect of the present application.

In the electric vehicle according to the embodiment of the present application, the battery life can be improved without expanding the space occupied by the battery by using the power battery pack according to the embodiment in the second aspect of the present application.

Other aspects and advantages of this application will be given in the following description, some of which will become apparent from the following description or may be learned from practices of this application.

REFERENCE NUMERALS

Related Art

Figure 1:
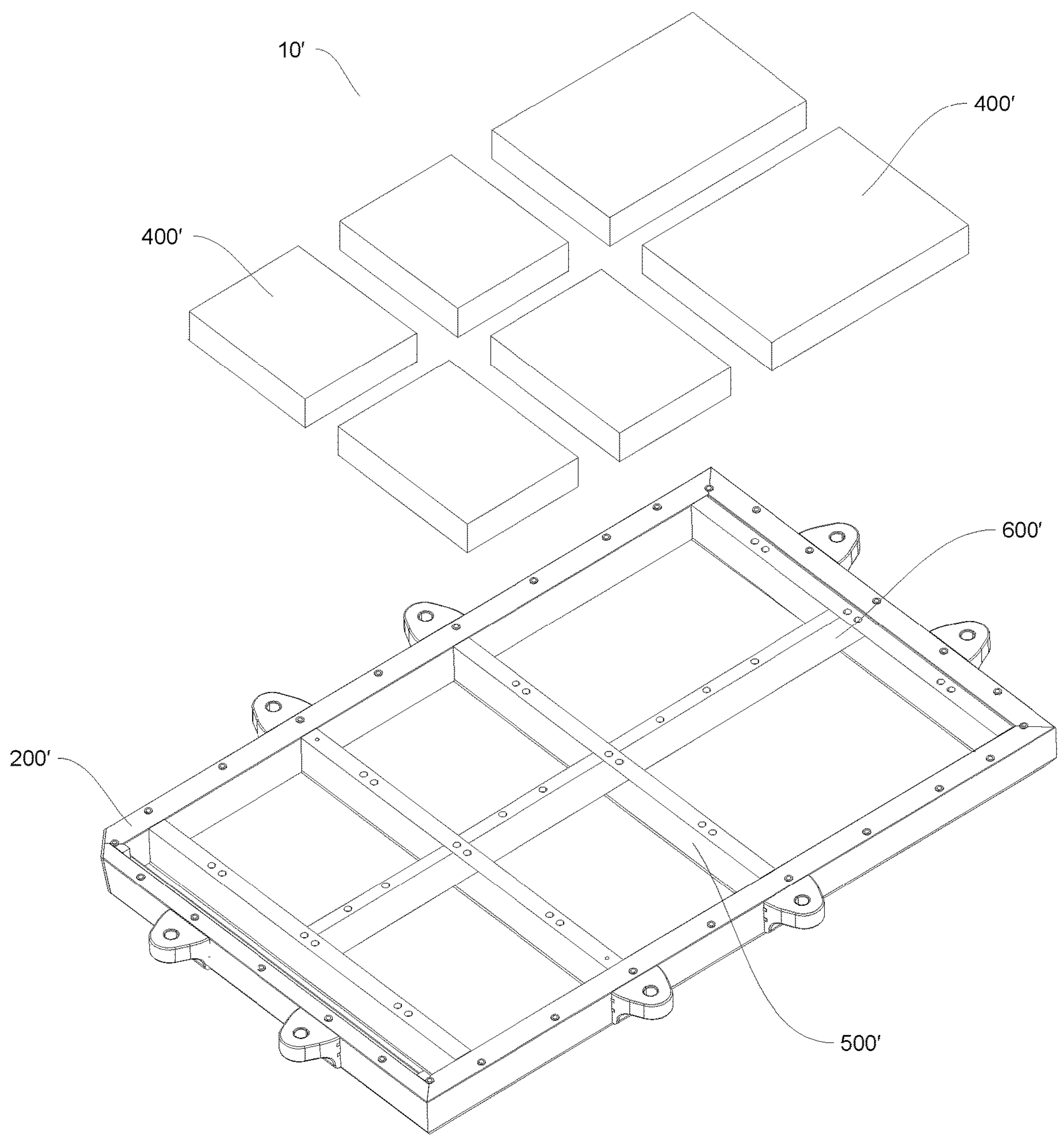
FIG. 1 is an exploded view of a power battery pack provided in the prior art.

10' power battery pack, 200" housing, 400' battery module, 600' longitudinal beam, 500' transverse beam

This Application

1 electric vehicle

10 power battery pack

100 cell, 110 cell body, 200 housing, 210 tray, 220 upper cover, 201 first side beam, 202 second side beam, 203 first end beam, 204 second end beam, 222 exhaust passage, 221 gas inlet

400 battery module

101 first electrode tab, 102 second electrode tab, 103 anti-explosion valve,

600 longitudinal beam, 500 transverse beam

A length direction of power battery pack 10, B width direction of power battery pack 10, C height direction of power battery pack 10

L length of cell body 110, H width of cell body 110, D thickness of cell body 110, W width of vehicle body, F width of housing 200.

DETAILED DESCRIPTION

Embodiments of this application are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary and used only for explaining this application, and should not be construed as a limitation on this application.

In the description of this application, it should be understood that orientation or position relationships indicated by the terms such as "vertical", "transverse", "length", "width", "thickness", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application.

In addition, in the description of this application, "a plurality of" means two or more than two.

Considering the status of power battery packs in the related art, this application provides a power battery pack and an electric vehicle having the power battery pack. The power battery pack has the advantages of high space utilization, high energy density, and long battery life.

A power battery pack 10 according to an embodiment of this application is described with reference to accompanying drawings.

As shown in FIG. 2 to FIG. 16, the power battery pack 10 according to an embodiment of the present application includes a housing 200 and a plurality of cells 100.

The plurality of cells 100 are provided in the housing 200, and the housing 200 can be understood as a housing for accommodating the plurality of cells 100. For example, the housing 200 may include a tray 210 and an upper cover 220. The tray 210 and the upper cover 220 work together to define a space accommodating the plurality of cells 100. The plurality of cells 100 are provided in the tray 210, and covered by the upper cover 220. The sum V1 of the volumes of the plurality of cells 100 and the volume V2 of the power battery pack 10 satisfy $V1/V2 \geq 55\%$.

It can be understood by those skilled in the art that V1 is the product of the volume of each cell 100 and the number of cells 100; and V2 is the overall volume of a three-dimensional shape defined by an external profile of the power battery pack 10, that is, a volume including the internal space of the battery pack 10, a volume of the three-dimensional area enclosed in space by the external profile of the battery pack 10. In electric vehicles, V1/V2 can be defined as a space utilization ratio.

In the power battery pack 10 according to the embodiment of the present application, by defining the ratio of the sum of the volumes of the cells 100 to the volume of the power battery pack 10, that is, V1/V2, to be ≥55%, the space utilization of the power battery pack 10 is improved, and more cells 100 can be arranged in the power battery pack 10. That is, more energy supply structures are arranged in the unit space to increase the energy density, thereby increasing the battery life without expanding the occupied space.

In some embodiments of the present invention, $V1/V2 \geq 60\%$.

In some embodiments of the present invention, $V1/V2 \geq 62\%$.

In some embodiments of the present invention, V1/V2≥65%.

Those skilled in the art can understand that due to some factors, for example, peripheral components will occupy the internal space of the housing 200, including an anti-collision space at a bottom of the tray, a liquid cooling system, a thermal insulation material, an insulation protection, an accessory for thermal safety, a flame exhaust passage, and a high-voltage power distribution module, etc., so the peak value of V1/V2 is usually 80%, that is, V1/V2≤80%.

The power battery pack 10 according to a specific embodiment of the present application is described below with reference to the drawings, in which a length direction of the power battery pack 10 is indicated by an arrow A, a width direction of the power battery pack 10 is indicated by an arrow B, and a height direction of the power battery pack 10 is indicated by an arrow C.

Figure 2:
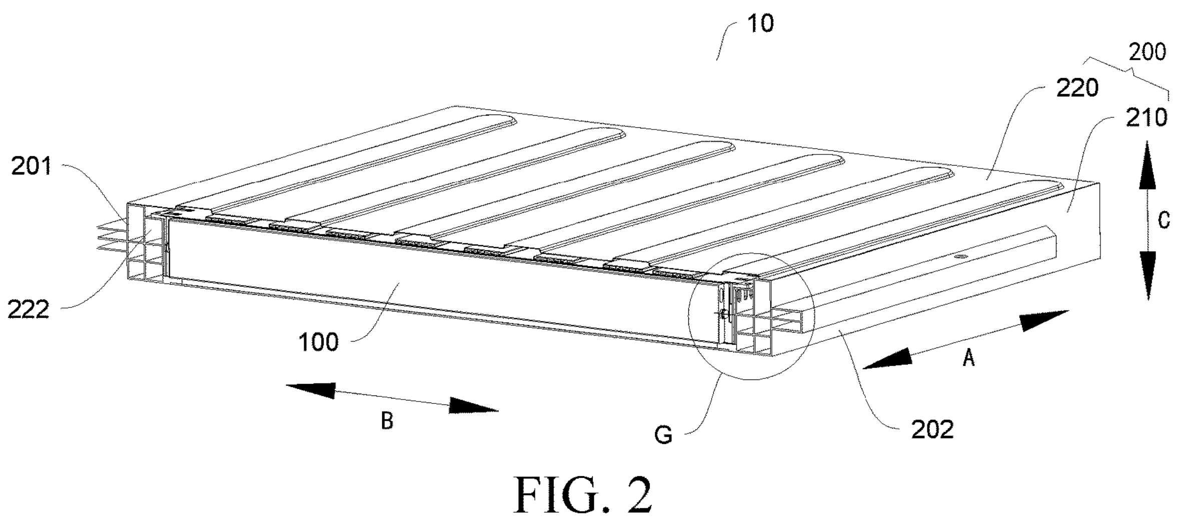
FIG. 2 is a cross-sectional view of a power battery pack according to an embodiment of this application.
Figure 3:
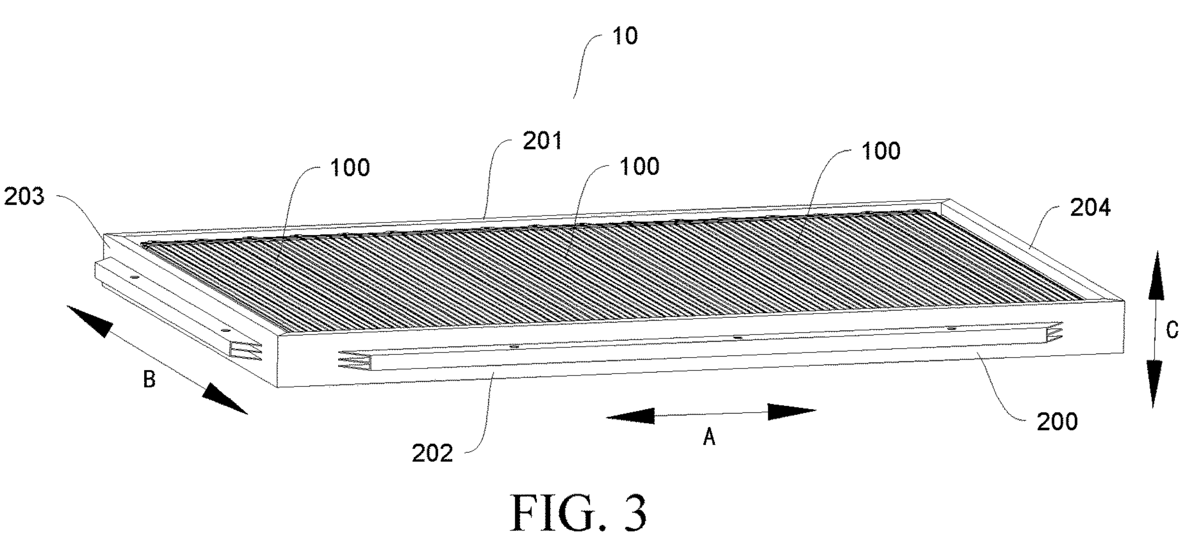
FIG. 3 is a three-dimensional diagram of a power battery pack according to an embodiment of this application.
Figure 4:
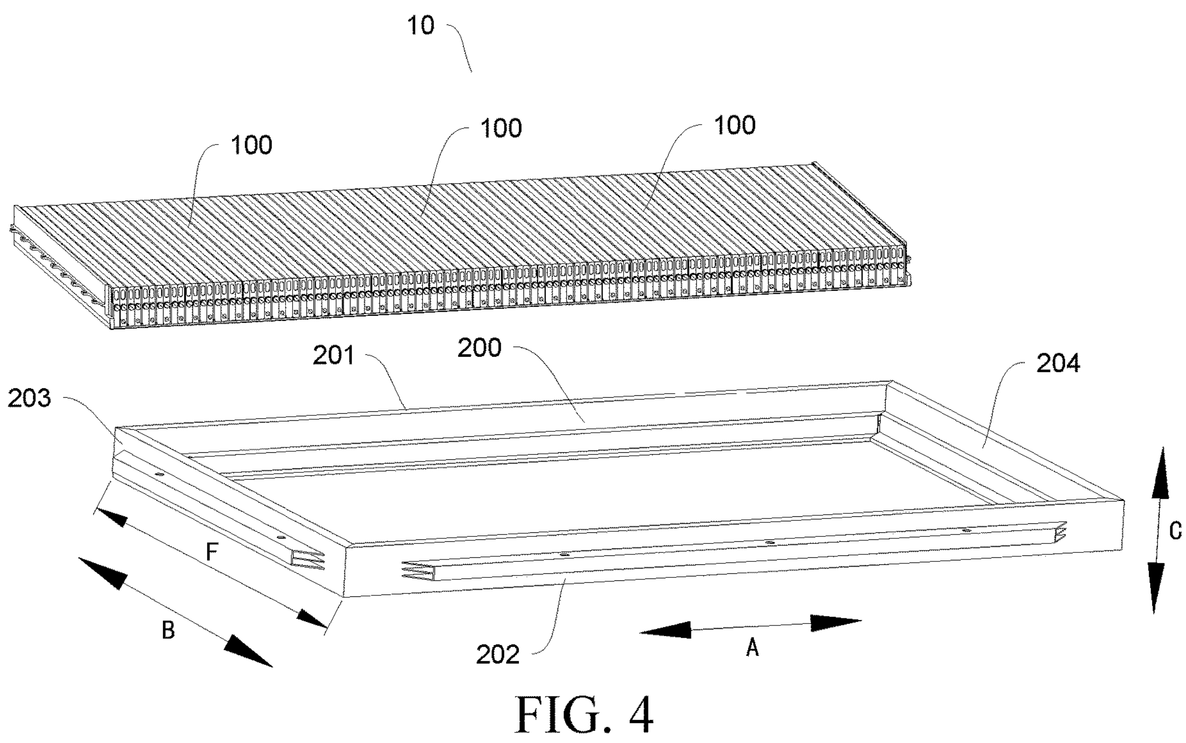
FIG. 4 is an exploded view of a power battery pack according to an embodiment of this application.

In some specific embodiments of the present application, as shown in FIG. 2 to FIG. 4, the length direction of the cell 100 is arranged along the width direction B of the power battery pack 10, and a plurality of cells 100 are arranged along the length direction A of the power battery pack 10. This is helpful to lead to a space utilization of the power battery pack 10 of 55%, 60%, 62%, 65% or higher.

In some specific embodiments of the present application, as shown in FIG. 3 and FIG. 4, in the width direction B of the power battery pack 10, a distance from the cell 100 to sidewalls of the housing 200 is less than the length of the cell 100. Specifically, in the width direction B of the power battery pack 10, a shortest distance from one end of the cell 100 to a side beam of the housing 200 adjacent to the end of the cell 100 is L1, a shortest distance from the other end of the cell 100 to a side beam of the housing 200 adjacent to the other end of the cell 100 is L2, and the length L0 of the cell 100 satisfies: L1+L2<<L0. In this way, the power battery pack 10 cannot additionally accommodate another cell 100 in the width direction B.

In other words, the housing 200 accommodates only one cell 100 in the width direction B of the power battery pack 10. That is, in the width direction B of the power battery pack 10, the cell 100 cannot be arranged in a pattern including two or more cells.

It can be understood that in the width direction B of the power battery pack 10, side beams are provided at two sides of the housing 200; and in the length direction A of the power battery pack 10, end beams are provided at two sides of the housing 200.

In some specific embodiments of this application, as shown in FIG. 3 and FIG. 4, the length of the cell 100 extends across the entire width direction B of the power battery pack 10. That is, along the width direction B of the power battery pack 10, the cell 100 extends from one side to the other side of the housing 200, and the length of the cell 100 is filled in the width direction B of the power battery pack 10. The housing 200 cannot accommodate two or more cells 100 in the width direction B of the power battery pack 10. Two ends of the cell 100 in the length direction can be fitted to the two opposite side walls of the housing 200 in the width direction B, for example, fixed to the housing 200. As a result, no transverse beams and longitudinal beams are required in the housing 200, and the connected cells 100 can directly act as the strengthening ribs. This greatly simplifies the structure of the housing 200, and reduces the space occupied by the strengthening ribs and by structures for mounting the cells 100, thereby improving the space utilization and improving the battery life.

Figure 13:
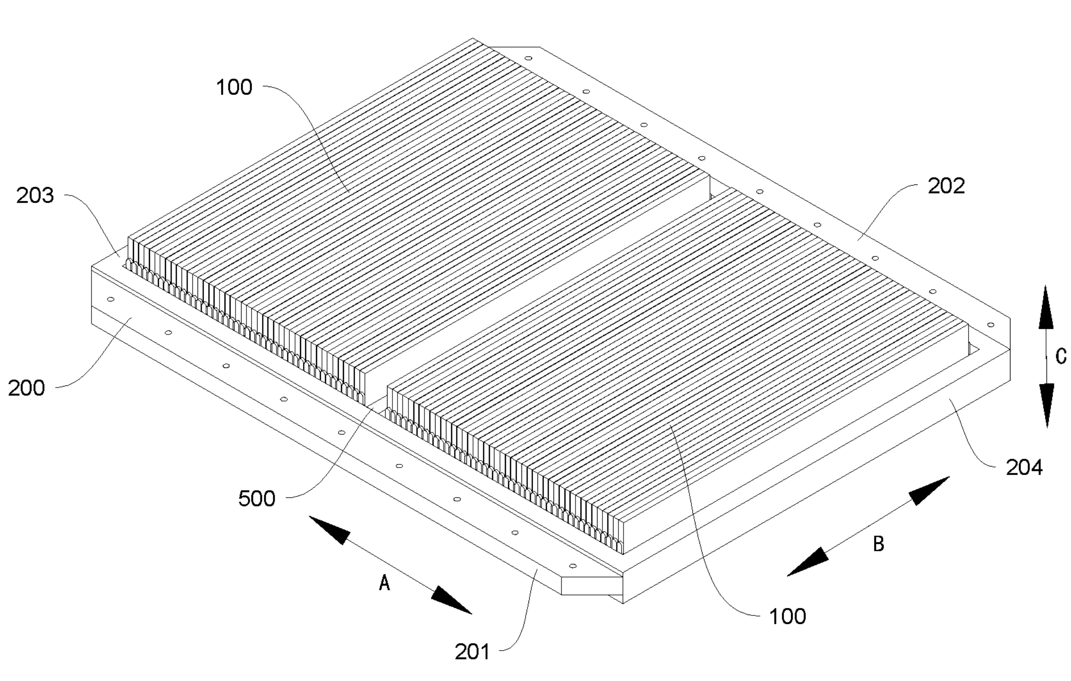
FIG. 13 is a three-dimensional diagram of a power battery pack according to a second optional embodiment of this application.
Figure 14:
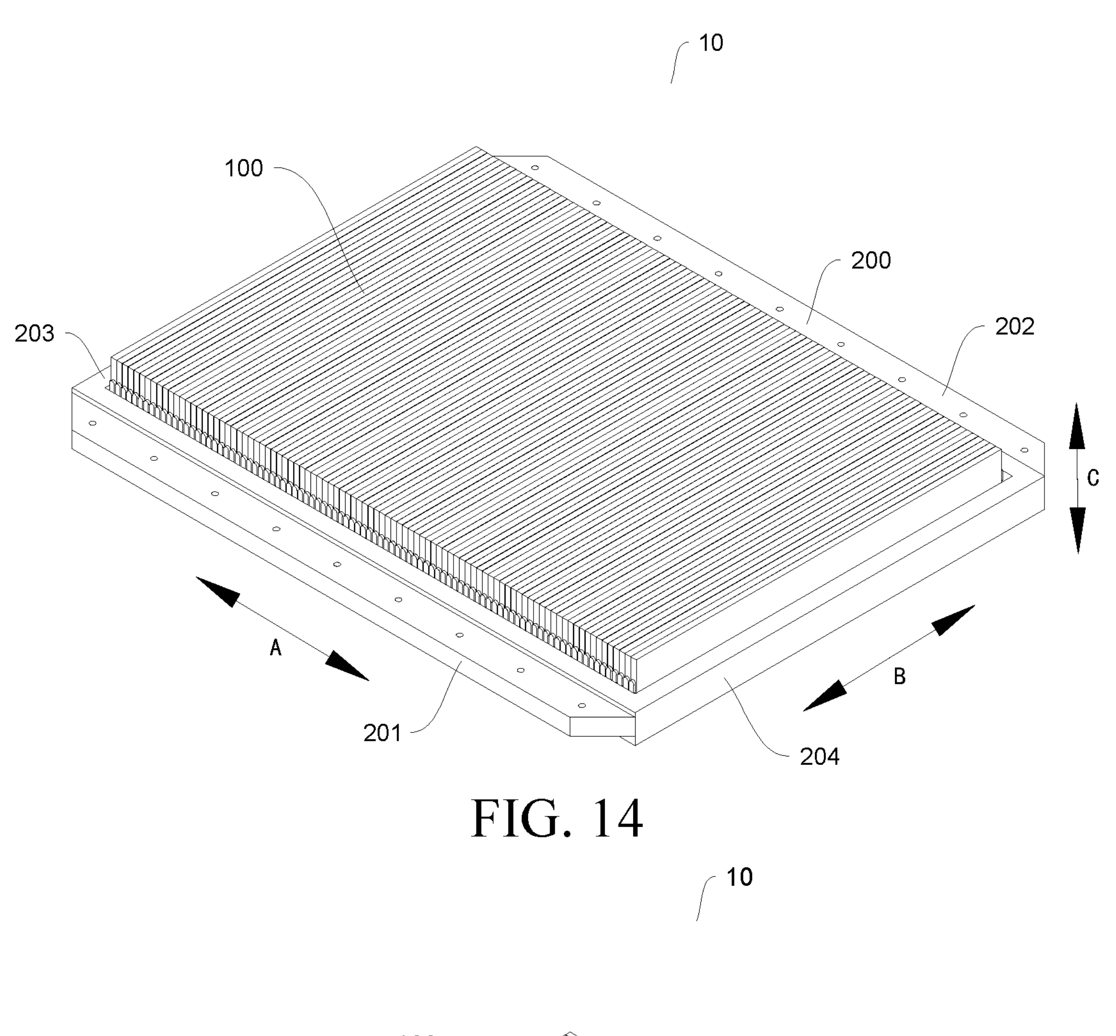
FIG. 14 is a three-dimensional diagram of a power battery pack according to a third optional embodiment of this application.

The embodiments of the present application are not limited to not providing transverse beams and longitudinal beams. In some embodiments of the present application, as shown in FIG. 13, a transverse beam 500 can be provided in the housing 200. The transverse beam 500 extends along the width direction B of the power battery pack 10, and a plurality of cells 100 are arranged along the length direction A of the power battery pack 10 to form a battery array. The transverse beam 500 divides the battery array into at least two parts along the length direction A of the power battery pack 10. Each part of the battery array includes at least one cell 100, and each part of the battery array constitutes a battery module 400.

Figure 12:
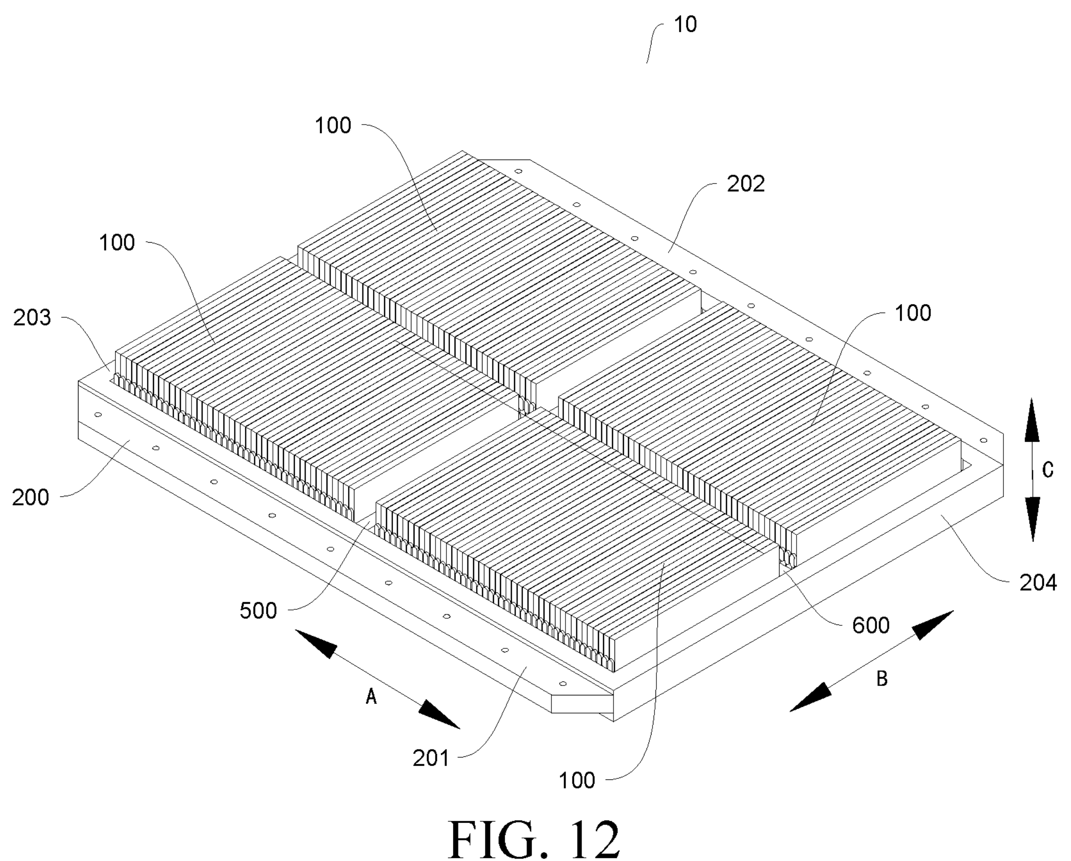
FIG. 12 is a three-dimensional diagram of a power battery pack according to a first optional embodiment of this application.

In some other embodiments of the present application, as shown in FIG. 12, a longitudinal beam 600 can also be provided in the housing 200. The longitudinal beam 600 extends along the length direction A of the power battery pack 10. The length direction of the cell 100 is arranged along the width direction B of the power battery pack 10. A plurality of cells 100 are arranged along the length direction A of the power battery pack 10 to form a battery array. At least two rows of battery arrays are arranged in the housing 200 along the width direction B of the power battery pack 10. Each row of battery array includes a plurality of cells 100 arranged along the length direction A of the power battery pack 10. The longitudinal beam 600 is located between two adjacent rows of battery arrays.

In addition, the transverse beam and longitudinal beam here can be replaced by other structural parts such as protective partitions, and heat insulation foam, etc, which are not limited in this application. That is to say, in this application, the battery array in the battery pack can be a whole or can be divided into multiple sub-battery arrays by the transverse beam and/or longitudinal beam or other partitions, for example, 1, 2, 3 or 4 sub-battery arrays.

In some specific embodiments of this application, the housing 200 includes side beams located at two sides of the power battery pack 10 in the width direction B, and both ends in the length direction of the cell 100 are supported by the side beams. The housing 200 includes end beams located at two ends of the power battery pack 10 in the length direction A, and the end beams provide an inward pressing force against the cells 100 adjacent to them.

As shown in FIG. 3 and FIG. 4, the housing 200 has a first side beam 201, a second side beam 202, a first end beam 203 and a second end beam 204. The first side beam 201, the second side beam 202, the first end beam 203 and second end beam 204 are sequentially connected end to end. The first side beam 201 and the second side beam 202 are opposite in the width direction B of the power battery pack 10, and the first end beam 203 and the second end beam 204 are opposite in the length direction A of the power battery pack 10. The first side beam 201 and the second side beam 202 provide support for the two ends of the cell 100 in the length direction, that is, one end of the cell 100 is supported by the first side beam 201 and the other end is supported by the second side beam 202. The first end beam 203 and the second end beam 204 provide a pressing force against two sides of the cell 100 in the thickness direction. That is, the first end beam 203 applies a force toward the second end beam 204 to the cell 100 arranged adjacent to the first end beam 203, and the second end beam 204 applies a force toward the first end beam 203 to the cell 100 arranged adjacent to the second end beam 204, to allow a plurality of cells 100 to be tightly arranged between the first end beam 203 and the second end beam 204 along the length direction A of the power battery pack 10, where the plurality of cells 100 fit to each other. In addition, the first end beam 203 and the second end beam 204 can limit the plurality of cells 100 in the length direction A of the power battery pack 10. Particularly when the cell 100 expands slightly, they can buffer and provide an inward pressing force against the cell 100, to prevent excessive expansion and deformation of the cell 100.

Figures 7, 8:
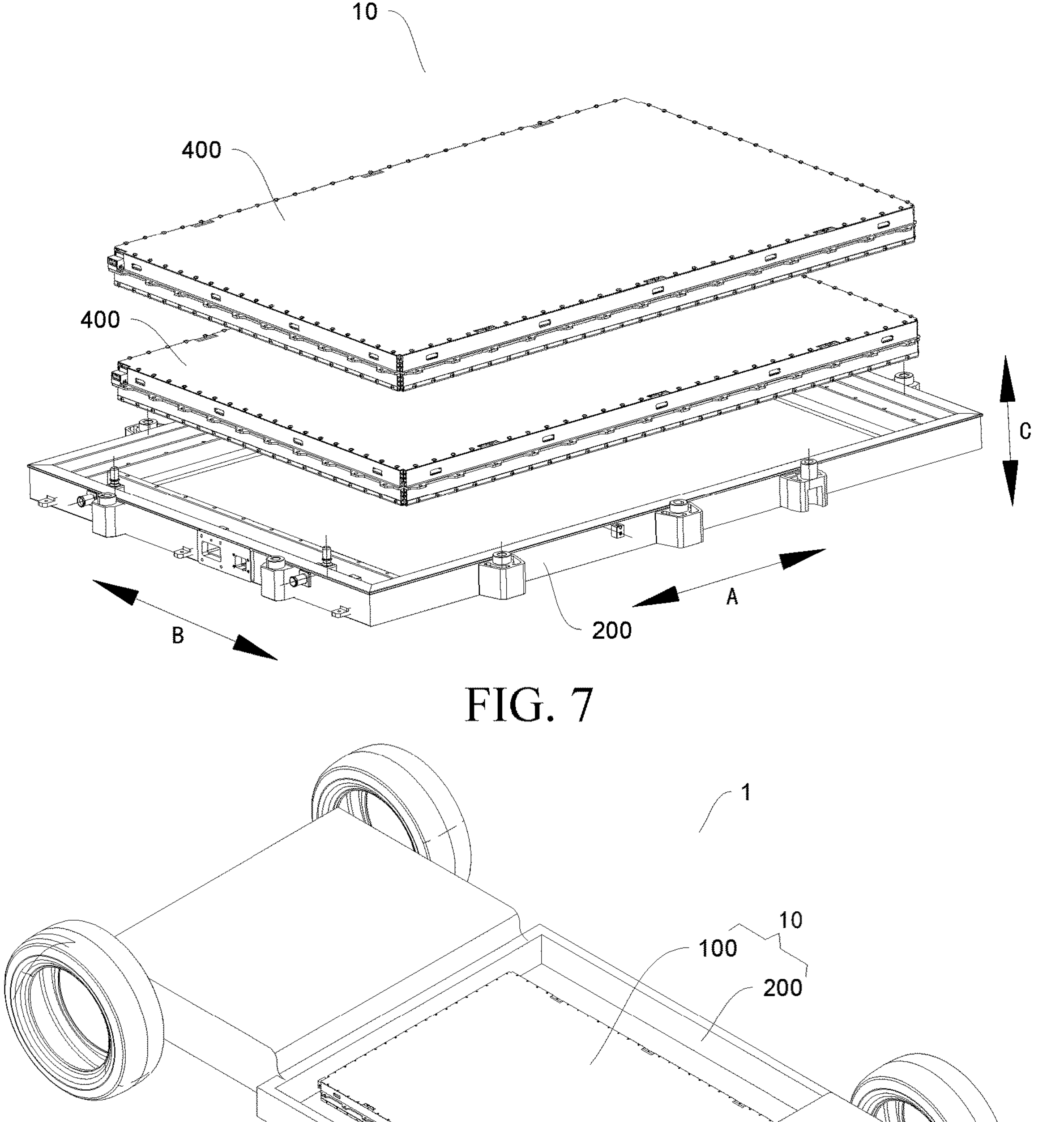
FIG. 7 is a schematic view showing the manner of arrangement of battery modules in a power battery pack according to another embodiment of this application.
FIG. 8 is a schematic structural diagram of an electric vehicle formed to having a housing of a power battery pack according to an embodiment of this application.

In some specific embodiments of the present application, as shown in FIG. 7, the length direction of the cell 100 is arranged along the width direction B of the power battery pack 10, and a plurality of cells 100 are arranged along the length direction A of the power battery pack 10 to form a battery array. There are at least two layers of battery arrays in the housing 200 along the height direction C of the power battery pack 10. As a result, the number of cells 100 is optimized, whereby the space utilization is increased to increase the energy density, and BIC and low-voltage sampling are easier to be integrally implemented.

Figure 15:
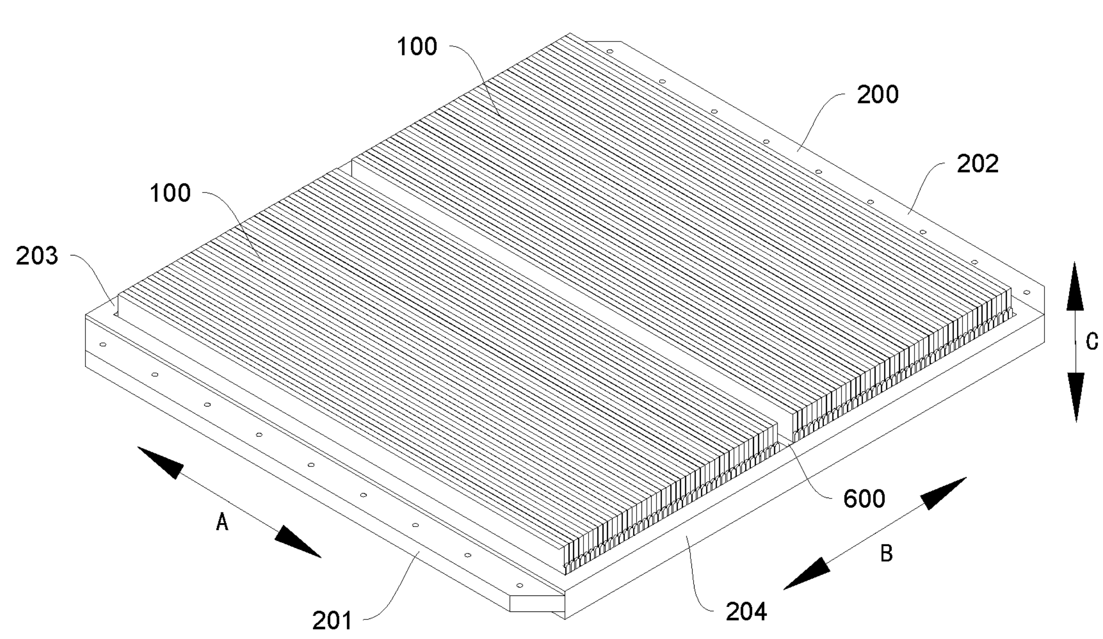
FIG. 15 is a three-dimensional diagram of a power battery pack according to a fourth embodiment of this application.
Figure 16:
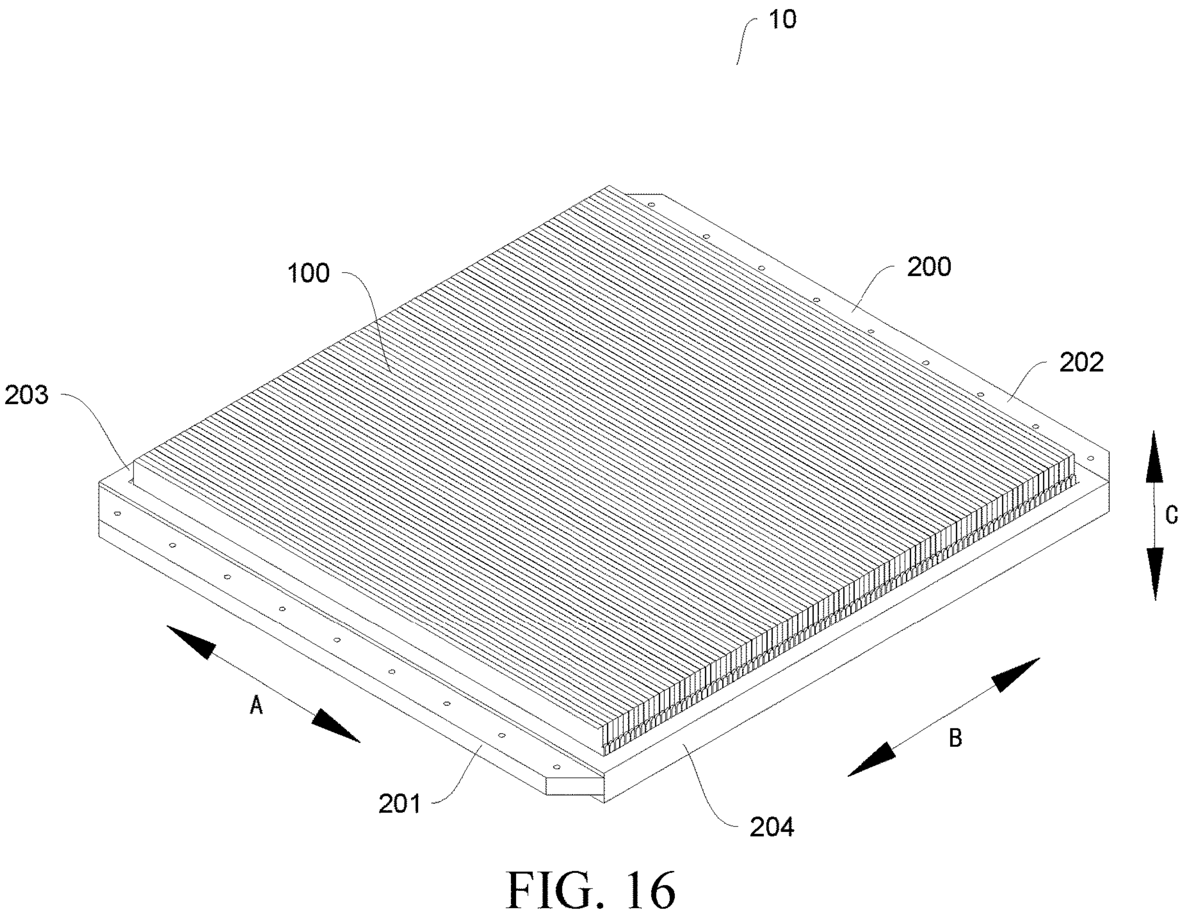
FIG. 16 is a three-dimensional diagram of a power battery pack according to a fifth optional embodiment of this application.

In some specific embodiments of the present application, as shown in FIG. 15 and FIG. 16, the length direction of the cell 100 is arranged along the length direction A of the power battery pack 10, and a plurality of cells 100 are arranged along the width direction B of the power battery pack 10. This leads to a space utilization of the power battery pack 10 of 55%, 60%, 62%, 65% or higher.

In some specific embodiments of the present application, as shown in FIG. 15 and FIG. 16, in the length direction A of the power battery pack 10, a distance from the cell 100 to end walls of and the housing 200 is less than the length of the cell 100. Specifically, in the length direction A of the power battery pack 10, a shortest distance from one end of the cell 100 to an end beam of the housing 200 adjacent to the end of the cell 100 is L3, a shortest distance from the other end of the cell 100 to an end beam of the housing 200 adjacent to the other end of the cell 100 is L4, and the length L0 of the cell 100 satisfies: $L3+L4<L0$. In this way, the power battery pack 10 cannot additionally accommodate another cell 100 in the length direction A.

In other words, the housing 200 accommodates only one cell 100 in the length direction A of the power battery pack 10. That is, in the length direction A of the power battery pack 10, the cell 100 cannot be arranged in a pattern including two or more cells.

It can be understood that in the width direction B of the power battery pack 10, side beams are provided at two sides of the housing 200; and in the length direction A of the power battery pack 10, end beams are provided at two sides of the housing 200.

In some specific embodiments of this application, as shown in FIG. 15 and FIG. 16, the length of the cell 100 extends across the entire length direction A of the power battery pack 10. That is, along the length direction A of the power battery pack 10, the cell 100 extends from one end to the other end of the housing 200, and the length of the cell 100 is filled in the length direction A of the power battery pack 10. The housing 200 cannot accommodate two or more cells 100 in the length direction A of the power battery pack 10. Two ends of the cell 100 in the length direction can be fitted to the two opposite end walls of the housing 200 in the length direction A, for example, fixed to the housing 200. As a result, no transverse beams and longitudinal beams are required in the housing 200, and the connected cells 100 can directly act as the strengthening ribs. This greatly simplifies the structure of the housing 200, and reduces the space occupied by the strengthening ribs and by structures for mounting the cells 100, thereby improving the space utilization and improving the battery life.

The embodiments of the present application are not limited to not providing longitudinal beams and transverse beams. In some embodiments of the present application, as shown in FIG. 15, a longitudinal beam 600 can be provided in the housing 200. The longitudinal beam 600 extends along the length direction A of the power battery pack 10, and a plurality of cells 100 are arranged along the width direction B of the power battery pack 10 to form a battery array. The longitudinal beam 600 divides the battery array into at least two parts along the width direction B of the power battery pack 10. Each part of the battery array includes at least one cell 100, and each part of the battery array constitutes a battery module 400.

In some other embodiments of the present application, a transverse beam 500 can also be provided in the housing 200. The transverse beam 500 extends along the width direction B of the power battery pack 10. The length direction of the cell 100 is arranged along the length direction A of the power battery pack 10. A plurality of cells 100 are arranged along the width direction B of the power battery pack 10 to form a battery array. At least two rows of battery arrays are arranged in the housing 200 along the length direction A of the power battery pack 10. Each row of battery array includes a plurality of cells 100 arranged along the width direction B of the power battery pack 10. The transverse beam 500 is located between two adjacent rows of battery arrays.

In addition, the transverse beam and longitudinal beam here can be replaced by other structural parts such as protective partitions, and heat insulation foam, etc, which are not limited in this application. That is to say, in this application, the battery array in the battery pack can be a whole or can be divided into multiple sub-battery arrays by the transverse beam and/or longitudinal beam or other partitions, for example, 1, 2, 3 or 4 sub-battery arrays. In some specific embodiments of this application, the housing 200 includes end beams located at two ends of the power battery pack 10 in the length direction A, and both ends in the length direction of the cell 100 are supported by the end beams. The housing 200 includes side beams located at two sides of the power battery pack 10 in the width direction B, and the side beams provide an inward pressing force against the cells 100 adjacent to them.

As shown in FIG. 16, the housing 200 has a first side beam 201, a second side beam 202, a first end beam 203 and a second end beam 204. The first side beam 201, the second side beam 202, the first end beam 203 and second end beam 204 are sequentially connected end to end. The first side beam 201 and the second side beam 202 are opposite in the width direction B of the power battery pack 10, and the first end beam 203 and the second end beam 204 are opposite in the length direction A of the power battery pack 10. The first end beam 203 and the second end beam 204 provide support for the two ends of the cell 100 in the length direction, that is, one end of the cell 100 is supported by the first end beam 203 and the other end is supported by the second end beam 204. The first side beam 201 and the second side beam 202 provide a pressing force against two sides of the cell 100 in the thickness direction. That is, the first side beam 201 applies a force toward the second side beam 202 to the cell 100 arranged adjacent to the first side beam 201, and the second side beam 202 applies a force toward the first side beam 201 to the cell 100 arranged adjacent to the second side beam 202, to allow a plurality of cells 100 to be tightly arranged between the first side beam 201 and second side beam 202 along the width direction B of the power battery pack 10, where the plurality of cells 100 fit to each other. In addition, the first side beam 201 and the second side beam 202 can limit the plurality of cells 100 in the width direction B of the power battery pack 10. Particularly when the cell 100 expands slightly, they can buffer and provide an inward pressing force against the cell 100, to prevent excessive expansion and deformation of the cell 100.

In some specific embodiments of the present application, as shown in FIG. 15, the length direction of the cell 100 is arranged along the length direction A of the power battery pack 10, and a plurality of cells 100 are arranged along the width direction B of the power battery pack 10 to form a battery array. There are at least one layer of battery arrays in the housing 200 along the height direction C of the power battery pack 10. As a result, the number of cells 100 is optimized, whereby the space utilization is increased to increase the energy density, and BIC and low-voltage sampling are easier to be integrally implemented.

Figure 6:
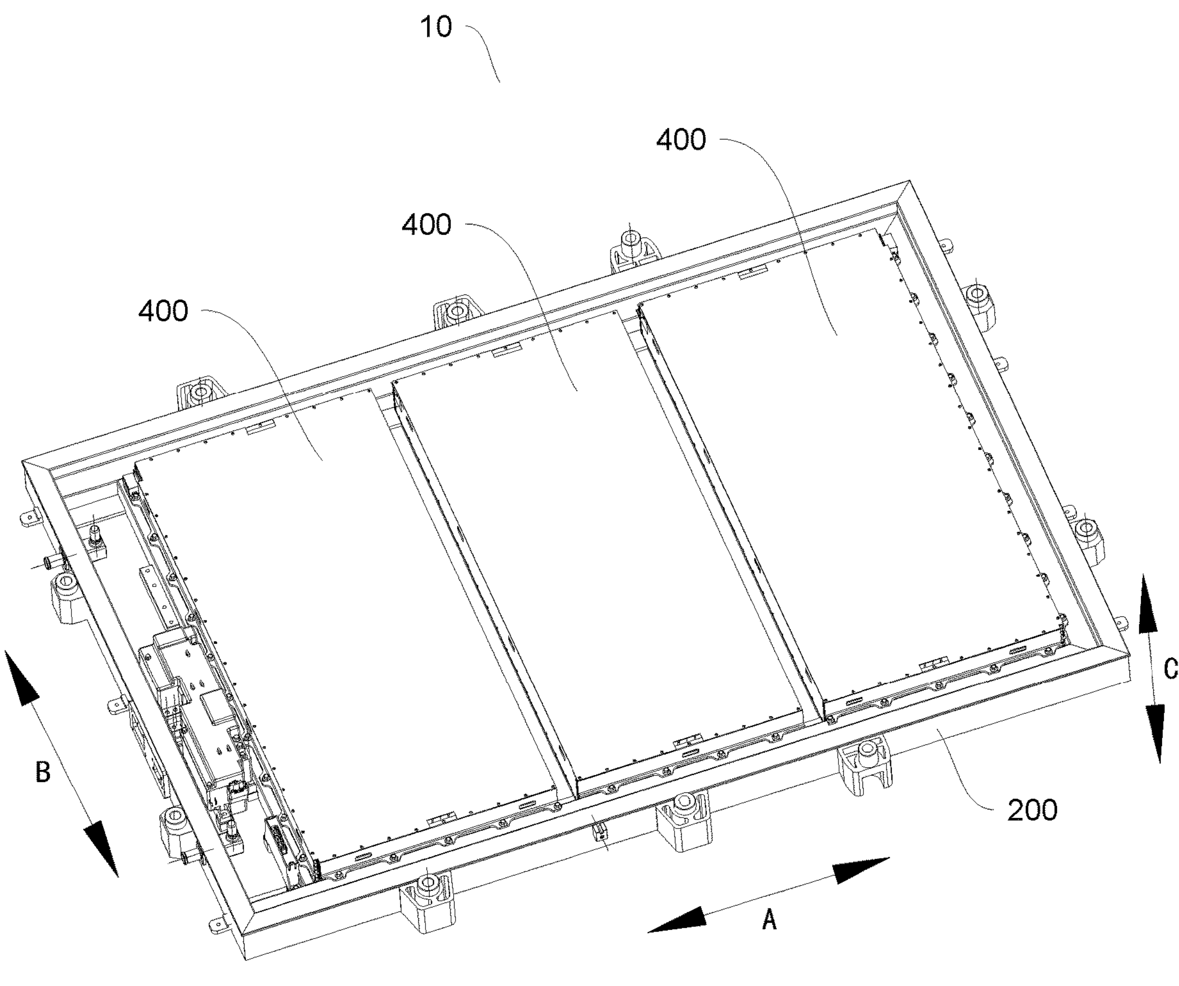
FIG. 6 is a schematic view showing the manner of arrangement of battery modules in a power battery pack according to an embodiment of this application.

In some specific embodiments of the present application, a plurality of cells 100 can be assembled into multiple battery modules 400. The multiple battery modules 400 can be arranged along the length direction A of the power battery pack 10 (as shown in FIG. 6), the multiple battery modules 400 can also be arranged along the width direction B of the power battery pack 10 (as shown in FIG. 15), or the multiple battery modules 400 can also be arranged along the height direction C of the power battery pack 10 to form a multilayer structure (as shown in FIG. 7). In other words, regardless of the cells 100 extending along the width direction B or the length direction A of the power battery pack 10, the plurality of cells 100 can be arranged in multiple layers along the height direction C of the power battery pack 10. The multiple battery modules 400 can also be arranged along both the length direction A and the height direction C of the power battery pack 10, or along both the width direction A and the height direction C of the power battery pack 10. As a result, the number of battery modules 400 is optimized, whereby the space utilization is increased to increase the energy density, and BIC and low-voltage sampling are easier to be integrally implemented. It should be understood that the battery module 400 in the embodiment of the present application does not have structures such as end plates and side plates.

In the related art, due to the small size and short length of the cell, the two opposite ends of the cell cannot be fitted to the two opposite side walls of the housing 200". Therefore, the longitudinal beams 600' and/or the transverse beams 500' (as shown in FIG. 1) is/are needed to be provided in the housing 200", to facilitate the cell assembly. When the cells are mounted in the housing 200" by means of the battery modules 400', there will be multiple cells along the width direction of the power battery pack 10'. That is, the cell does not extend between the two opposite side walls, but extend between two opposite longitudinal beams 600' or transverse beams 500'. The battery module is fixed to an adjacent longitudinal beam 600' and/or transverse beam 500' by a fastener.

Since the longitudinal beams 600' and/or the transverse beams 500' are provided in the housing 200" in the related art, the longitudinal beams 600' and/or the transverse beams 500' occupy a large mounting space for accommodating the cells in the housing 200", causing a low space utilization of the housing 200". Generally, the ratio of the sum of the volumes of cells to the volume of the housing 200" is about 40%, or even lower. In other words, only about 40% of the space in the housing 200" in the related art is available for mounting the cells, resulting in a limited number of cells accommodated in the housing 200", limited capacity and voltage of the entire power battery pack 10', and poor battery life of the power battery pack 10'.

A cell according to an embodiment of the present application includes a cell body, and the cell body has a length L, a width H and a thickness D. The length L of the cell body is greater than the width H, the width H of the cell body is greater than the thickness D, the length L of the cell body is greater than 600 mm, and the length L and the width H of the cell body satisfy L/H=4-21. According to some embodiments of the present application, the length L and the width H of the cell body satisfy L/H=9-13. When cells satisfying the above size requirements are provided in the power battery pack 10, on the one hand, the use of longitudinal beams and/or transverse beams in the housing 200 is reduced. Even the longitudinal beams and/or the transverse beams may be not provided in the housing 200, to reduce the space occupied by the longitudinal beams and/or the transverse beams in the housing 200, and improve the space utilization of the housing 200. On the other hand, the use of end plates and side plates in the battery module 400 is reduced, and the space occupied by the end plates and the side plates in the housing 200 is reduced, to improve the space utilization of the housing 200. As many cells 100 as possible are arranged in the housing 200, to increase the capacity, voltage and battery life of the entire power battery pack.

Moreover, since no longitudinal beams and/or transverse beams are needed to be arranged in the housing 200, on the one hand, the manufacturing process of the housing 200 is simplified, the assembly complexity of cells 100 is reduced, and the production cost is reduced; and on the other hand, the weights of the housing 200 and the entire power battery pack 10 are reduced, achieving a light weight of the power battery pack 10. In particular, when the power battery pack 10 is mounted on an electric vehicle, the battery life of the electric vehicle is improved, and a light weight of the electric vehicle is achieved.

In addition, the cell 100 itself can be used to strengthen the structural strength of the housing 200. That is, there is no need to provide a strengthening structure for enhancing the structural strength in the housing 200, and the cell 100 itself can directly replace the strengthening structure to ensure the structural strength of the housing 200, thus ensuring that the housing 200 is not prone to deformation under the action of an external force. Compared with the battery pack disclosed in Chinese Patent Document CN107925028A, the housing 200 can not only accommodate and protect the cells 100, but also support the cells 100 to improve the overall load-bearing capacity of the power battery pack 10. The length of the cell 100 enhances the strength of the battery pack 10.

According to some embodiments of the present application, the length L and the thickness D of the battery body satisfy: L/D=23-208. By increasing the ratio of dimensions of the battery, the surface area of a single cell 100 is increased, to increase the heat dissipation area and increase the heat dissipation rate of the cell 100, thereby improving the safety of the entire power battery pack 10 and making the power battery pack 10 safer and more reliable. According to some embodiments of the present application, the length L and the width D of the cell body satisfy: L/D=50-120.

In some specific embodiments of this application, the cell 100 includes a cell body 110 (which can be understood as a body part excluding small-sized protruding structures such as electrode tabs), and the volume V of the cell body 110 and the energy E of the cell body 110 satisfy: V/E≤2000 $mm^3 \cdot Wh^{-1}$. Therefore, it is possible to ensure a sufficient heat dissipation area to ensure the heat dissipation effect, and reduce the volume ratio of the cells 100, which is beneficial to the compact arrangement of a plurality of cells 100 in the power battery pack 10.

Figure 9:
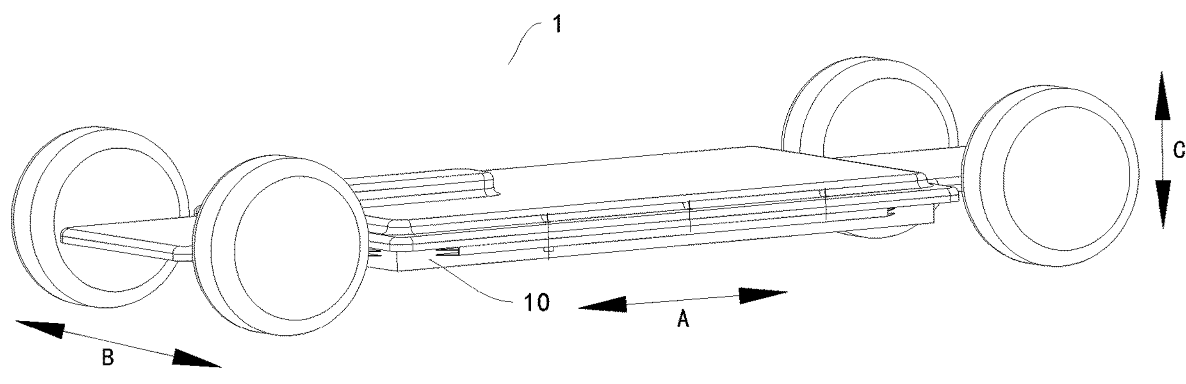
FIG. 9 is a schematic structural diagram of an electric vehicle according to an embodiment of this application.
Figure 10:
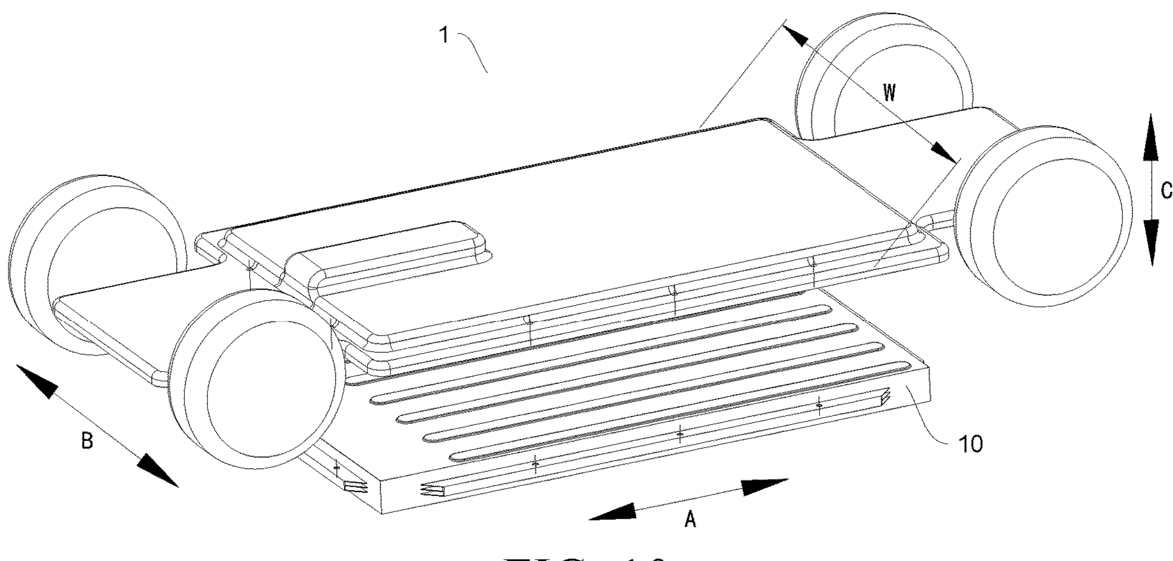
FIG. 10 is an exploded view of an electric vehicle according to an embodiment of this application.

In some specific embodiments of the present application, as shown in FIG. 9 and FIG. 10, the housing 200 is different from the battery pack housing disclosed in Chinese Patent Document CN107925028A, especially in terms of the size and load bearing capacity. The housing 200 includes a vehicle tray 210 that is fitted and connected to a vehicle body, to form a structure fitted to the vehicle body for accommodating and carrying the cells 100. The vehicle tray 210 is a separately produced tray for accommodating and mounting the cells 100. After the cell 100 is mounted in the vehicle tray 210, the vehicle tray 210 can be mounted to the vehicle body by a fastener. For example, the vehicle tray is hanged on a chassis of an electric vehicle, to accommodate and bear the cells.

When the power battery pack 10 is used as a power battery pack for providing electric energy on a vehicle, the length direction of the cell 100 can be arranged along a length direction of the vehicle body, that is, the front and rear directions of the vehicle. At this time, the length L of the cell body 110 of the cell 100 may be 600-2500 mm. In some embodiments, L may be 600-1500 mm, so that the length of the cell 100 can be adapted to the length of the vehicle. When the power battery pack 10 is used as a power battery pack for providing electric energy on a vehicle, the length direction of the cell 100 can be arranged along a width direction of the vehicle body, that is, the left and right directions of the vehicle. At this time, the length L of the cell body 110 of the cell 100 may be 600-2500 mm, so that the length of the cell 100 can be adapted to the width of the vehicle.

In some specific embodiments of the present application, as shown in FIG. 8, the housing 200 may also be directly formed on the electric vehicle, that is, the housing 200 is a device for mounting the cells 100 and formed at any appropriate position on the electric vehicle. For example, the housing 200 may be formed on the chassis of the electric vehicle.

In some specific embodiments of the present application, when the power battery pack 10 is arranged on an electric vehicle, unlike the battery pack disclosed in Chinese Patent Document CN107925028A, the power battery pack 10 also includes at least one of a battery management system (BMS), a battery connector, a battery sampler, a battery thermal management system, and other components required for the vehicle battery. The width direction B of the power battery pack 10 is arranged along the width direction of the vehicle body, that is, the left and right directions of the vehicle; and the length direction of the power battery pack 10 is arranged along the length direction of the vehicle body, that is, the front and rear directions of the vehicle. The present application is not limited thereto. The width direction B of the power battery pack 10 may be arranged along the length direction of the vehicle body, and the length direction A of the power battery pack 10 may be arranged along the width direction of the vehicle body.

Those skilled in the art can understand that the orientation of the cells 100 in the power battery pack 10 and the orientation of the power battery pack 10 on the electric vehicle can be combined in various forms. For example, the length direction of the cell 100 can be arranged along the width direction B of the power battery pack 10 or along the length direction A of the power battery pack 10. The width direction B of the power battery pack 10 can be arranged along the width direction of the vehicle body or along the length direction of the vehicle body. For example, regardless of the width direction B of the power battery pack 10 being arranged along the width direction of the vehicle body or along the length direction of the vehicle body, the length direction of the cell 100 is arranged along the width direction of the vehicle body. The relative direction of arrangement of the cell 100, the power battery pack 10 and the vehicle body can be arranged according to the practical application to meet various requirements.

The cell 100 according to an embodiment of the present application will be described below with reference to the accompanying drawings.

In the following specific embodiments, the length L, the width H and the thickness D are in millimeters (mm), the surface area S is in square millimeter ($m^2$), the volume V is in cubic millimeter ($mm^3$), and the energy E is in watt-hour (Wh).

Figure 5:
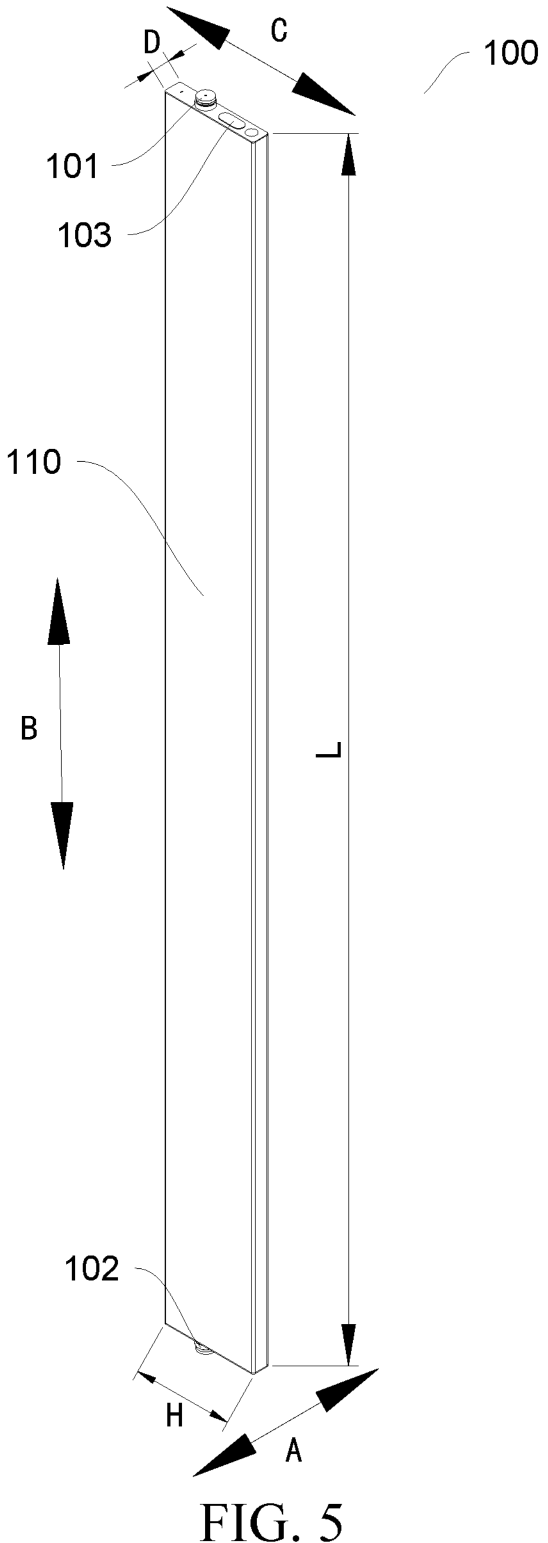
FIG. 5 is a schematic structural diagram of a cell according to an embodiment of this application.

As shown in FIG. 5, the cell 100 according to an embodiment of the present application includes a cell body 110. It can be understood that the cell body 110 is a body part excluding small-sized protruding structures such as electrode tabs. The cell body 110 has a length L, a width H, and a thickness D.

The length L of the cell body 110 is greater than the width H of the cell body 110, the width H of the cell body 110 is greater than the thickness D of the cell body 110, the length L of the cell body is greater than 600 mm, and the length L of the cell body 110 and the width H of the cell body 110 satisfy: L/H=4-21. According to some embodiments of the present application, the length L of the cell body 110 and the width H of the cell body 110 satisfy: L/H=9-13.

In the cell 100 according to the embodiment of the present application, by designing the ratio of the length L to the width H of the cell body 110, the cell body 110 can be reasonably flattened and elongated at a given certain volume. On the one hand, this is conducive to the overall arrangement in the power battery pack (for example, the arrangement of the power battery pack 10 according to the above-mentioned embodiment of the present application), thereby improving the space utilization, enhancing the energy density, and thus increasing the battery life of the power battery pack. On the other hand, this can ensure that the cell 100 has a large enough heat dissipation area to transfer the internal heat to the outside in time to prevent the heat from accumulating inside, thereby forming a higher energy density and supporting the improvement of battery life.

According to some embodiments of the present application, to optimize the arrangement of the cell 100 in the battery pack and improve the heat dissipation capacity of the cell 100, the length L and the thickness D of the cell body 110 satisfy: L/D=23-208.

In some specific embodiments of the present application, as shown in FIG. 5, the cell body 110 is structured to have a shape of rectangular parallelepiped with a smooth outer surface to have a certain structural strength. The cell core of the cell is placed in a prismatic cell casing, the opening of the cell casing is sealed with a cover plate, and an electrolyte is injected. Compared with the cell with an aluminum laminated film, the cell 100 according to the embodiment of the present application has good thermal conductivity, and can effectively eliminate the problem of heat dissipation caused by a large-sized structure, when used in conjunction with a conventional battery thermal management structure. Compared with cylindrical cells, the space utilization is higher, and the production and assembly processes are simpler.

When the cell 100 according to the embodiment of the present application is arranged in the housing 200 of the power battery pack 10, the length direction and the thickness direction of the cell body 110 may extend in the horizontal directions, and the width direction of the cell body 110 may extend in the vertical direction. That is, the cell 100 stands on side. The horizontal and vertical directions are based on the direction of the power battery pack 10 when it is used (for example, when used in an electric vehicle).

In some specific embodiments of this application, to optimize the arrangement of the cell 100 in the power battery pack 10 to increase the energy density and increase the battery life, and to make the arrangement of the cell body 110 more compact and the energy more concentrated in the limited space of the housing 200, other parameters of the cell 100 are designed.

According to some embodiments of the present application, the length L of the cell body 110 and the volume V of the cell body 110 satisfy: $L/V=0.0005\ mm^{-2}$-$0.002\ mm^{-2}$. According to some embodiments of the present application, the width H of the cell body 110 and the volume V of the cell body 110 satisfy: $H/V=0.0001\ mm^{-2}$-$0.00015\ mm^{-2}$. According to some embodiments of the present application, the thickness D of the cell body 110 and the volume V of the cell body 110 satisfy: $D/V=0.0000065\ mm^{-2}$~$0.00002\ mm^{-2}$. For a cell body 110 of a certain volume, the ratio of each of the length L, the width H, and the thickness D to the volume V can be designed to optimize the spatial distribution of unit energy, thereby facilitating the arrangement in the housing 200.

According to some embodiments of the present application, the length L of the cell body 110 and the surface area S of the cell body 110 satisfy: $L/S=0.002\ mm^{-1}$-$0.005\ mm^{-1}$. The length L of the cell body 110 and the energy E of the cell body 110 satisfy: $L/E=0.8\ mm\cdot Wh^{-1}$-$2.45\ mm\cdot Wh^{-1}$. According to some embodiments of the present application, the length L of the cell body 110 and the energy E of the cell body 110 satisfy: $L/E=1.65\ mm\cdot Wh^{-1}$-$2.45\ mm\cdot Wh^{-1}$. As such, the cell 100 is facilitated to extend across two opposite sides of the housing 200 in its length direction, thereby improving the battery life of the power battery pack 10, while the structural strength and heat dissipation effect of the cell 100 are considered.

In some other embodiments of this application, the surface area S of the cell body 110 and the volume V of the cell body 110 satisfy: $S/V=0.1$-$0.35\ mm^{-1}$. Therefore, it is possible to ensure a sufficient heat dissipation area to ensure the heat dissipation effect, and reduce the volume ratio of the cells 100, which is beneficial to the compact arrangement of a plurality of cells 100 in the power battery pack 10.

The surface area S of the cell body 110 and the energy E of the cell body 110 satisfy: $S/E\leq 1000\ mm^2\cdot Wh^{-1}$. This can ensure sufficient heat dissipation on the surface of the cell 100. Especially when a ternary or a high-nickel ternary cathode material is employed in the power battery, the internal heat of the battery can be conducted in time, which is beneficial to the battery safety. In addition, the cell 100 in the embodiment of the present application is a prismatic cell with a smooth outer surface, which has a certain structural strength, and has a good thermal conductivity. Compared with a cell with a corrugated surface area, the process and subsequent assembly are less difficult.

In some specific embodiments of the present application, as shown in FIG. 5, the cell 100 further includes a first electrode tab 101 and a second electrode tab 102.

The first electrode tab 101 is provided at one end of the cell body 110 in the length direction, and the second electrode tab 102 is provided at the other end of the cell body 110 in the length direction. In other words, the length direction of the cell 100 may be the current direction inside the cell 100, that is, the current direction inside the cell 100 is as indicated by an arrow B. In this manner, since the current direction is the same as the length direction of the cell 100, the effective heat dissipation area of the cell 100 is larger and the heat dissipation efficiency is higher. Here, the first electrode tab 101 may be a positive electrode tab of the cell 100, and the second electrode tab 102 is a negative electrode tab of the cell 100; or, the first electrode tab 101 is the negative electrode tab of the cell 100, and the second electrode tab 102 is the positive electrode tab of the cell 100.

In some specific embodiments of the present application, as shown in FIG. 5, the cell 100 further includes at least one anti-explosion valve 103.

The at least one anti-explosion valve 103 is provided on at least one end of the cell body 110 in the length direction. When the cell 100 fails and expands, the gas pressure inside is enough to break through a flipping sheet in the at least one anti-explosion valve 103, causing a short circuit of the cell 100 to ensure the safety of the cell 100, and prevent the cell 100 from explosion.

Those skilled in the art can understand that the arrangement of the at least one anti-explosion valve 103 can be applied not only to a cell with an aluminum casing, but also to a pouch cell. In addition, the at least one anti-explosion valve 103 can also be arranged at other positions than the ends of the cell body 100.

In some specific embodiments of the present application, when the cell is a pouch cell, the length L and the width H of the cell body satisfies: $L/H=7$-$20$.

In some specific embodiments of the present application, the two ends of the cell body 110 in the length direction are respectively provided with an anti-explosion valve 103.

Figure 11:
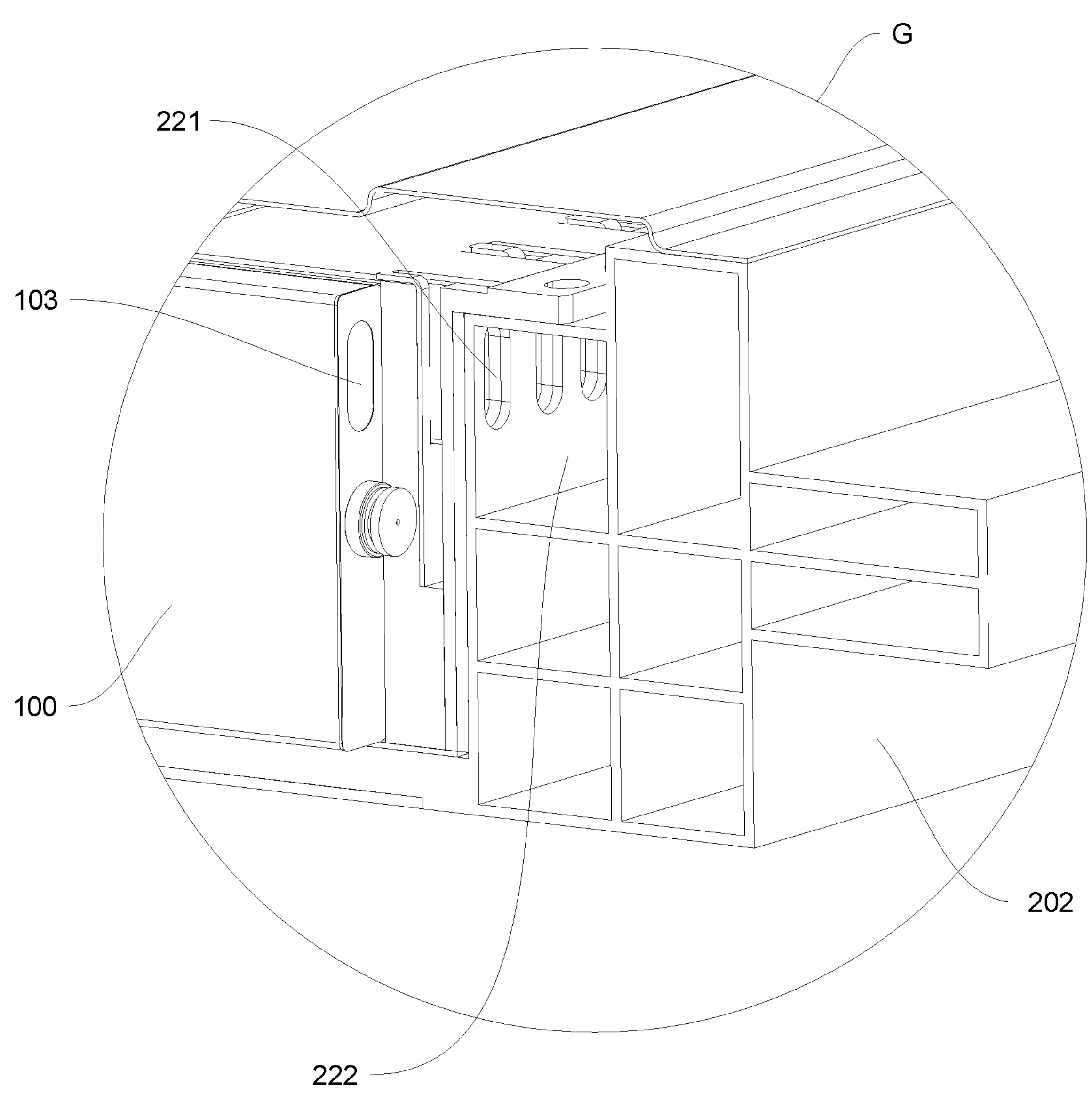
FIG. 11 is an enlarged view of region G in FIG. 2.

For example, as shown in FIG. 2, FIG. 5 and FIG. 11, the cell 100 is provided with an anti-explosion valve 103 at a first end facing the first side beam 201, and the first side beam 201 is provided with exhaust passages 222 therein. A gas inlet 221 is provided at a position on the first side beam 201 corresponding to the anti-explosion valve 103 of each cell 100, and the gas inlet 221 communicates with the exhaust passage 222. The housing 200 is provided with an exhaust vent communicating with the exhaust passage 222.

And/or the cell 100 is provided with an anti-explosion valve 103 at a second end facing the second side beam 202, and the second side beam 202 is provided with exhaust passages 222 therein. A gas inlet 221 is provided at a position on the second side beam 202 corresponding to the anti-explosion valve 103 of each cell 100, and the gas inlet 221 communicates with the exhaust passage 222. The housing 200 is provided with an exhaust vent communicating with the exhaust passage 222.

In the related art, during the use of the cell, if the gas pressure inside the cell increases to a certain degree, the anti-explosion valve is opened, so that the flame, smoke or gas inside the cell will be discharged through the anti-explosion valve. The flame, smoke or gas accumulates inside the power battery pack, and if not discharged in time, will cause secondary damage to the cell. In the embodiment of the present application, since the first side beam 201 and/or second side beam 202 is/are provided with the gas inlet 221 corresponding to the anti-explosion valve 103 of the cell 100, and the first side beam 201 and/or second side beam 202 is/are provided the exhaust passage 222 therein, the anti-explosion valve 103 is opened when the gas pressure inside the cell 100 increases, and the flame, smoke or gas inside the cell will directly enter the exhaust passages 222 inside the first side beam 201 and/or the second side beam 202 through the gas inlet 221, and will be discharged out of the first side beam 201 and/or the second side beam 202 through the exhaust vent, for example, discharged into the atmosphere through the exhaust vent. In this way, the flame, smoke or gas will not accumulate inside the battery pack 200, thereby preventing the flame, smoke or gas from causing secondary damage to the cell 100.

In addition, one end of each cell 100 in the plurality of cells 100 is exhausted through the exhaust passage 222 in the first side beam 201, and the other end of each cell 100 in the plurality of cells 100 is exhausted through the exhaust passage 222 in the second side beam 202. As a result, the two ends of the cell 100 are exhausted through different passages, which increases the exhaust distance and forms crossover exhaust, thereby reducing the temperature.

An electric vehicle 1 according to an embodiment of the present application is described below with reference to the accompanying drawings. The electric vehicle may include commercial vehicles, special vehicles, electric bicycles, electric motorcycles, electric scooters, and other electric vehicles which need to be powered by a power battery pack to provide electrical energy to drive them to travel.

As shown in FIG. 9 and FIG. 10, the electric vehicle 1 according to the embodiment of the present application includes a power battery pack 10 according to the above-mentioned embodiment of the present application, where the housing 200 can be integrally formed on the electric vehicle, or the housing 200 can also be a separately produced vehicle tray where the cell 100 is accommodated and mounted.

In the electric vehicle 1 according to the embodiment of the present application, the battery life can be improved without expanding the space occupied by the battery by using the power battery pack 10 according to the embodiment of the present application.

In some specific embodiments of the present application, as shown in FIG. 9 and FIG. 10, the power battery pack 10 is arranged at a bottom of the electric vehicle 1, and the housing 200 is fixedly connected to a chassis of the electric vehicle 1. Since the mounting space at the chassis of the electric vehicle 1 is large, when the power battery pack 10 is provided on the chassis of the electric vehicle 1, the number of cells 100 can be increased as many as possible, thereby increasing the battery life of the electric vehicle 1.

In some specific embodiments of this application, as shown in FIG. 9 and FIG. 10, the electric vehicle 1 includes a power battery pack 10 arranged at a bottom of the electric vehicle 1. The housing 200 is fixedly connected to a chassis of the electric vehicle 1. The width direction of the power battery pack 10 extends along a width direction of a vehicle body of the electric vehicle 1, that is, the left and right directions of the electric vehicle 1, and the length direction of the battery pack 10 extends along a length direction of the vehicle body of the power battery pack 10, that is, the front and rear directions of the electric vehicle 1. In other embodiments, the electric vehicle 1 may include a plurality of power battery packs 10 arranged at the bottom of the electric vehicle 1, and the shape and size of the plurality of power battery packs 10 may be the same or different. Each power battery pack 10 can be adjusted according to the shape and size of the chassis of the electric vehicle 1, and the plurality of power battery packs 10 are arranged along the length direction, that is, the front and rear directions of the vehicle body.

In some specific embodiments of the present application, the ratio of the width F of the housing 200 to the width W of the vehicle body satisfies: 50%≤F/W≤80%. In some other embodiments of the present application, the length L of the cell body in the width direction of the power battery pack and the width W of the vehicle body satisfy: 46%≤L/W≤76%. In the foregoing embodiments, this can be achieved by arranging only one housing 200 along the width direction of the vehicle body. When there are multiple housings 200, the multiple housings 200 are arranged along the length direction of the vehicle body. Generally, for most vehicles, the width W of the vehicle body is 500-2000 mm, for example, 500 mm, 600 mm, 1600 mm, 1800 mm, or 2000 mm. According to some embodiments of the present application, the width W of the vehicle body is 600-2000 mm, for example, 600 mm, 1600 mm, 1800 mm, or 2000 mm. According to this application, the length of the vehicle body is 500-5000 mm. For passenger vehicles, the width of the passenger vehicles is usually 500-1800 mm. According to some embodiments of this application, the width of the passenger vehicles can also be 600-1800 mm. According to this application, the length of the vehicle body of the passenger vehicles is 500-4000 mm.

In some other embodiments of the present application, the width F of the housing 200 is 500-1500 mm, and according to some embodiments of the present application, the width F of the housing 200 is 600-1500 mm, which is much larger than the battery pack housing disclosed in Chinese Patent Document CN107925028A, to facilitate the accommodation of the battery module 400 in the battery pack in CN107925028A, and ensure the battery life. This size mate with the size of the vehicle body.

In some specific embodiments of the present application, the cell 100 includes a cell body 110, where the ratio of the length L of the cell body 110 to the width W of the vehicle body satisfies: 46%≤L/W≤76%. In this embodiment, this can be achieved by arranging only one cell 100 along the width direction of the vehicle body. In other possible implementations, multiple battery modules 400 or multiple cells 100 can be arranged in the length direction, while such size requirements are met. In some embodiments, the length L of the cell body 110 is 600-1500 mm.

In summary, compared with the prior art, the cell is designed to have a long size of up to 2500 mm in this application, and the following technical effects are accomplished by applying the cell to a battery pack:

(1) The volume utilization of the battery pack is significantly improved, and the volumetric energy density of the battery pack is increased. The volume utilization in the industry is currently about 40%. In contrast, cells can be arranged fully in the battery pack in the present application, to give a volume utilization of 60% or higher and even up to 80%, and an increase in volumetric energy density of 20% or more. In the same vehicles using the cells and manner of arrangement of the present invention, the energy density can be increased by 20%-30%, and the distance in kilometers that the vehicle travels can also be increased by 20%-30%.

(2) The costs of the battery pack are significantly reduced. Because the cell itself provides a mechanical strengthening function, reinforcing ribs used in the battery tray can be reduced or omitted, making the fabrication process of the battery pack simpler, and reducing the manufacturing costs. In addition, according to this application, the cell size can fit the size of the battery pack, and the cells can be directly disposed side by side in the battery pack, different from the prior art where a plurality of cells need to be disposed side by side in a module frame formed by two end plates and two side plates, and then the battery modules are assembled to form a battery pack. The cell size in this application is long enough, and a plurality of cells can be directly disposed side by side in the battery pack, so that the use of end plates and side plates for assembling battery modules and a large number of fasteners such as screws for fixedly mounting the battery modules is avoided or reduced, making the assembly process of cells simpler, and significantly reducing the manufacturing costs in labor and materials. These are conducive to the popularization of new energy vehicles.

(3) The stability and reliability of the battery pack are increased. A more complex battery pack assembly process indicates a higher defect rate, and indicates an increase in the possibility of loosening and unstable mounting of the battery pack, adversely affecting the quality of the battery pack and reducing the stability and reliability of the battery pack. In this application, cells are assembled to form the battery pack, and because the assembly process becomes simpler, the stability and reliability of the battery pack are increased, and accordingly the defect rate of the battery pack is reduced.

(4) The heat dissipation-related safety performance of the battery pack is significantly improved. The temperature rise of the battery pack is a combined result of heat production and heat dissipation. With the same capacity, the heat production of the cell is constant. In this application, the cell is designed to be flattened and elongated, and thus has a better dissipation effect and the temperature rise of the cell decreases. Under a given working condition of the battery pack, the temperature rise of the battery pack is reduced and the safety performance of the battery pack is greatly improved, when the cell is used.

Based on the significant technical effect brought by long cells, to enable the cell to support itself, the support strength of the housing may be increased by making improvements in terms of the forming process and the structural design, and the length-width ratio of the housing is controlled in a predetermined range. In addition, the internal resistance of the cell can be reduced by means such as optimizing the current collection path. Moreover, the liquid injection process may also be improved to solve the problem of long liquid injection time caused by long cell size.

Other configurations and operations of the cell 100, the power battery pack 10, and the electric vehicle 1 according to the embodiments of the present application are known to those of ordinary skill in the art, and will not be described in detail here.

The present application will be described below in connection with Comparative Embodiments 1 and 2 and Embodiments 1 to 3. By designing the size parameters of the cell 100 according to the embodiment of the present application, the power battery has an obviously improved heat dissipation effect.

In the following embodiments and comparative embodiments, the battery is a lithium iron phosphate battery.

Under the same conditions, the cells in Comparative Embodiment 1 and Embodiments 1-5 are quickly charged at a rate of 2C, and the temperature rise of the cells is measured during the quick charge process. In the table below, the selections of parameters including cell length, width, thickness, volume, surface area and energy in each embodiment and comparative embodiment are recorded, and the specific temperature rise is recorded.

From the data in the table, it can be seen that in the cell 100 (i.e. Embodiments 1-5) provided in this application, the temperature rise is somewhat lower than that in the comparative embodiment under the same quick charging conditions, so the present application has a better heat dissipation effect than the prior art.

| | Comparative Embodiment 1 | Embodiment 1 | Embodiment 2 | Embodiment 3 | Embodiment 4 | Embodiment 5 |
|---|---|---|---|---|---|---|
| Cell body length (mm) | 173 | 905 | 1280 | 700 | 600 | 1500 |
| Cell body width (mm) | 113.9 | 113.9 | 109 | 109 | 150 | 105 |
| Cell body thickness (mm) | 50 | 9.6 | 7 | 12.5 | 14.5 | 13.5 |
| Cell body volume ($mm^3$) | 985235 | 989563.2 | 976640 | 953750 | 1305000 | 2126250 |
| Cell body surface area ($mm^2$) | 58146.02 | 223535 | 296960 | 170100 | 197400 | 355500 |
| Cell body length/cell body thickness | 1.52 | 7.95 | 11.74 | 6.422018349 | 4 | 14.28571429 |
| Cell body length/cell body thickness | 3.46 | 94.2708333 | 182.8571429 | 56 | 41.37931034 | 111.1111111 |
| Cell body length/cell body volume ($mm^{-2}$) | 0.000176 | 0.00091455 | 0.001310616 | 0.000733945 | 0.00045977 | 0.000705467 |
| Cell body width/cell body volume ($mm^{-2}$) | 0.000116 | 0.0001151 | 0.000111607 | 0.000114286 | 0.000114943 | 0.000049383 |
| Cell body thickness/cell body volume ($mm^{-2}$) | 0.000051 | 0.0000097 | 0.000007167 | 0.000013106 | 0.000011111 | 0.000006349 |
| Cell body length/cell body surface area ($mm^{-1}$) | 0.002975 | 0.00404858 | 0.004310345 | 0.004115226 | 0.003039514 | 0.004219409 |

-continued

| | Comparative Embodiment 1 | Embodiment 1 | Embodiment 2 | Embodiment 3 | Embodiment 4 | Embodiment 5 |
|---|---|---|---|---|---|---|
| Cell body surface area/cell body volume ($mm^{-1}$) | 0.059017 | 0.2258926 | 0.30406291 | 0.178348624 | 0.151264368 | 0.167195767 |
| Cell temperature rise (° C.) | 22.24 | 16.20 | 15.56 | 17.92 | 21.92 | 21.7 |
| Housing temperature rise (° C.) | 12.24 | 6.5 | 5.56 | 7.92 | 11.95 | 11.7 |

In description of this specification, description of reference terms such as "specific embodiments", or "an example", means including specific features, structures, materials, or features described in the embodiment or example in at least one embodiment or example of this application. In this specification, exemplary descriptions of the foregoing terms do not necessarily refer to the same embodiment or example.

Although the embodiments of this application have been shown and described, a person of ordinary skill in the art should understand that various changes, modifications, replacements and variations may be made to the embodiments without departing from the principles and spirit of this application, and the scope of this application is as defined by the appended claims and their equivalents.

What is claimed is:

1. A battery pack, for an electric vehicle, comprising:

a housing with a cell-to-pack design; and a plurality of cells provided in the housing, each cell comprises a cell body having a length L, a width H, a thickness D, and a volume V, the length L of the cell body being greater than the width H, and the width H of the cell body being grater than the thickness D;

wherein the battery pack has a length direction and a width direction perpendicular to each other; a length direction of the cell is arranged along the length direction of the battery pack, and the housing accommodates only one cell along the length direction of the battery pack; or a length direction of the cell is arranged along the width direction ofthe battery pack, and the housing accommodates only one cell along the width direction of the battery pack; and wherein the plurality of cells has a total volume V1, the battery pack has a volume V2, and V1/V2 equal to or greater than 55%.

2. The battery pack according to claim 1, wherein the length L and the width H of the cell body satisfy L/H=9-13.

3. The battery pack according to claim 1, wherein the length L and the thickness D of the cell body satisfy L/D=23-208.

4. The battery pack according to claim 1, wherein the length L of the cell body and the volume V of the cell body satisfy L/V=0.0005-0.002 $mm^{-2}$.

5. The battery pack according to claim 1, wherein the width H of the cell body and the volume V of the cell body satisfy H/V=0.0001 $mm^{-2}$-0.00015 $mm^{-2}$.

6. The battery pack according to claim 1, wherein the length direction of the cell is arranged along the length direction of the battery pack, and two ends of the cell in the length direction are fitted to two opposite side walls of the housing in the length direction of the battery pack; or the length direction of the cell is arranged along the width direction of the battery pack, and two ends of the cell in the length direction are fitted to two opposite side walls of the housing in the width direction of the battery pack.

7. The battery pack according to claim 1, wherein the cell body has a surface area S satisfying S=L*H*2+L*D*2, wherein the length L of the cell body and the surface area S of the cell body satisfy L/S=0.002 $mm^{-1}$-0.005 $mm^{-1}$.

8. The battery pack according to claim 1, wherein the cell body has a surface area S satisfying S=L*H*2+L*D*2, wherein the surface area S of the cell body and the volume V of the cell body satisfy S/V=0.1 $mm^{-1}$-0.35 $mm^{-1}$.

9. The battery pack according to claim 1, wherein the cell body has a surface area S satisfying S=L*H*2+L*D*2, wherein the surface area S of the cell body and the energy E of the cell body satisfy S/E<1000 $mm^2.Wh^{-1}$.

10. The battery pack according to claim 1, wherein the length L of the cell body and the energy E of the cell body satisfy L/E=0.8 mm $Wh^{-1}$-2.45 mm $Wh^{-1}$.

11. The battery pack according to claim 1, wherein the length L of the cell body and the energy E of the cell body satisfy L/E=1.65 mm $Wh^{-1}$-2.45 mm $Wh^{-1}$.

12. The battery pack according to claim 1, wherein the length L of the cell body is 600-1500 mm.

13. The battery pack according to claim 1, wherein the length direction and the thickness direction of the cell body extend along horizontal directions, and the width direction of the battery body extends along a vertical direction.

14. The battery pack according to claim 1, wherein the cell further comprises:

a first electrode tab, provided at one end of the cell body along the length direction; and a second electrode tab, provided at the other end of the cell body along the length direction.

15. The battery pack according to claim 1, wherein the cell is a prismatic cell with an aluminum casing.

16. The battery pack according to claim 15, further comprising at least one anti-explosion valve, provided on at least one end of the cell body in the length direction.

17. The battery pack according to claim 15, wherein two ends of the cell body in the length direction are respectively provided with an anti-explosion valve.

18. The battery pack according to claim 1, wherein the cell is a pouch cell, and the length L and the width H of the cell body satisfy L/H=7-20.

19. The battery pack according to claim 1, wherein the V1/V2 equal to or greater than 60%.

20. The battery pack according to claim 1, wherein the V1/V2 equal to or greater than 55% and equal to or less than 80%.

* * * * *